United States Patent
Tung (10) Patent No.: US 7,920,485 B2
(45) Date of Patent: Apr. 5, 2011

(54) UNSUPERVISED TRAFFIC ESTIMATION FOR LOW-POWER MEDIA STREAMING

(75) Inventor: Chien-Cheng Tung, Fremont, CA (US)

(73) Assignee: Ralink Technology Corporation, Jhubei (TW)

( * ) Notice: Subject to any disclaimer, the term of this patent is extended or adjusted under 35 U.S.C. 154(b) by 204 days.

(21) Appl. No.: 12/177,732

(22) Filed: Jul. 22, 2008

(65) Prior Publication Data

US 2010/0020696 A1   Jan. 28, 2010

(51) Int. Cl.
*H04L 12/28* (2006.01)
(52) U.S. Cl. ........................ 370/254; 370/503
(58) Field of Classification Search .................. 370/311, 370/241, 252, 310, 350, 254, 503–520; 455/572–574, 127.1, 343.1–343.5
See application file for complete search history.

(56) References Cited

U.S. PATENT DOCUMENTS

| 2009/0285142 | A1* | 11/2009 | Zhang et al. | 370/311 |
| 2010/0091693 | A1* | 4/2010 | Pelletier et al. | 370/311 |

OTHER PUBLICATIONS

Beacon Frame, Wikipedia, the free encyclopedia, http://en.wikipedia.org/wiki/Beacon_frame, Sep. 26, 2007, 1 page.
Jim Geier, 802.11 Beacons Revealed, Tutorials, http://www.wi-fiplanet.com/tutorials/article.php/1492071, Sep. 3, 2009, 6 pages.

* cited by examiner

*Primary Examiner* — Kwang B Yao
*Assistant Examiner* — Kenan Cehic
(74) *Attorney, Agent, or Firm* — Sawyer Law Group, P.C.

(57) ABSTRACT

A method and system for processing data streams is disclosed. In one embodiment, the method includes establishing a plurality of initial sample zones; establishing a plurality of wakeup zones; sampling a plurality of data packets based on the plurality of initial sample zones; estimating the traffic based on the sampling of the plurality of data packets; and modifying the wakeup zones based on the estimated traffic. According to the method and system disclosed herein, the traffic estimation enables a mobile station to optimize wakeup periods.

8 Claims, 6 Drawing Sheets

UNSUPERVISED TRAFFIC ESTIMATION FOR LOW-POWER MEDIA STREAMING

FIELD OF THE INVENTION

The present invention relates to computer networks, and more particularly to a method and system for processing data streams.

BACKGROUND OF THE INVENTION

Media streaming has become popular on handheld devices. Power saving is a key feature on handheld devices. For lower data rate streaming such as voice and audio the IEEE 802.11 has provided a well-known, fairly effective power saving feature. Typically, in IEEE 802.11, the power saving feature employs beacon frames, which wake up mobile stations during a sleep mode. Beacon frames control the wakeup period for a given mobile station, as the mobile station wakes up during transmission and goes to sleep when there is no transmission. Typically, the mobile station determines the beacon interval from the beacon frame. A beacon interval is the amount of time between beacon frame transmissions, and is typically fixed (e.g., fixed at 100 ms).

Unfortunately, the beacon interval can create unwanted buffer overhead and delay for higher rate streaming such as video. For example, if the beacon interval is 100 ms and if the data packets carry voice-grade data (e.g., 64 Kbits at 6.4 Kbits/sec), the buffering is not a problem. For higher data rate streaming, such as MPEG2/1-1.264 video streaming, the power saving method requires a larger buffer. For example, if the beacon interval is 100 ms and if the data packets carry video-grade data (e.g., 20 Mbits/sec at 2 Mbits/sec), buffering would be a problem if the buffer were not sufficiently larger. In a beacon interval, the buffer would accumulate video data at 2 Mbit/sec. As such, the access point would need at least a 2 Mbit buffer in order to achieve some power savings. However, the larger buffer requirement is expensive to make and requires more space.

Accordingly, what is needed is an improved method and system for data packet transmission. The present invention addresses such a need.

SUMMARY OF THE INVENTION

A method and system for processing data streams is disclosed. In one embodiment, the method includes establishing a plurality of initial sample zones; establishing a plurality of wakeup zones; sampling a plurality of data packets based on the plurality of initial sample zones; estimating the traffic based on the sampling of the plurality of data packets; and modifying the wakeup zones based on the estimated traffic. According to the method and system disclosed herein, the traffic estimation enables a mobile station to optimize wakeup periods.

DETAILED DESCRIPTION OF THE INVENTION

The present invention relates to computer networks, and more particularly to a method and system for processing data streams. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for processing data streams are disclosed. The method includes establishing a plurality of initial sample zones and sampling a plurality of data packets based on the plurality of initial sample zones. The method also includes establishing a plurality of wakeup zones. The method also includes collecting traffic statistics based on the sampled data packets, and estimating the traffic based on the traffic statistics. The method also includes modifying the wakeup zones based on the estimated traffic. According to the method and system disclosed herein, the traffic estimation enables a mobile station to optimize wakeup periods. To more particularly describe the features of the present invention, refer now to the following description in conjunction with the accompanying figures.

Figure 1:
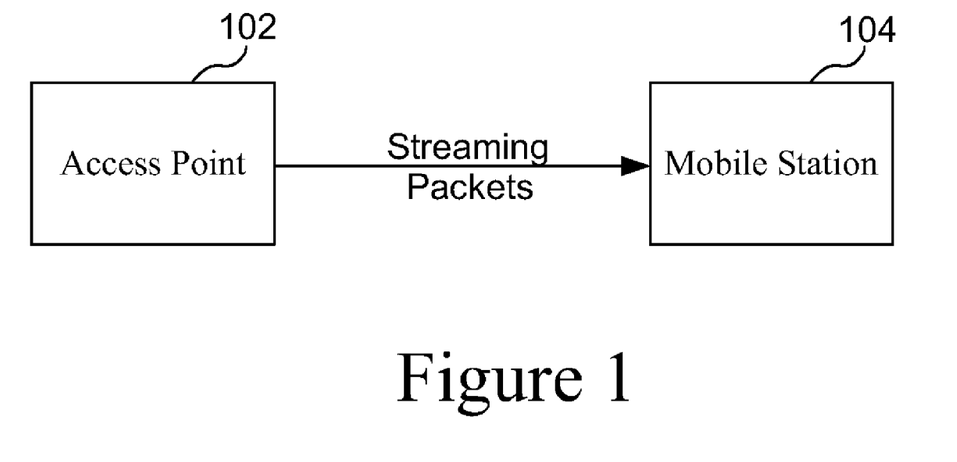
FIG. 1 is a block diagram of an access point in communication with a mobile station.

FIG. 1 is a block diagram of an access point 102 in communication with a mobile station 104. As FIG. 1 shows, the access point 102 is operable to send streaming packets to the mobile station 104. In particular embodiments, the packet stream may include data packets, beacons, and other management packets.

Figure 2:
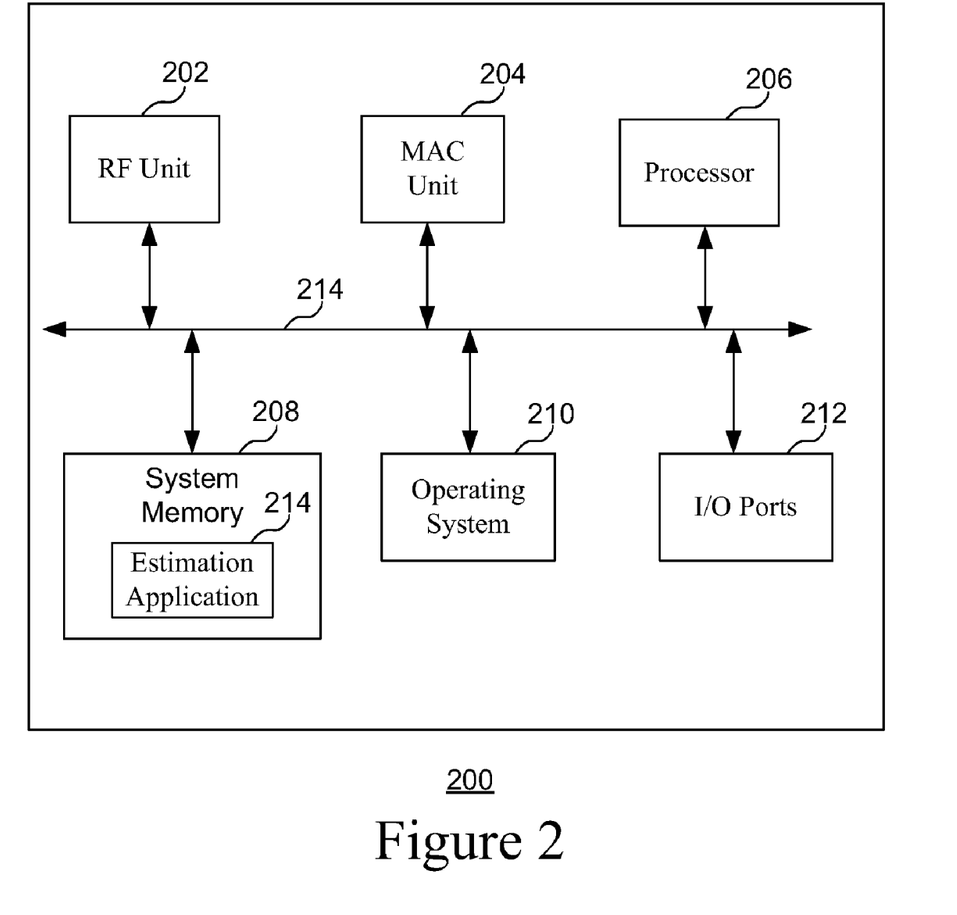
FIG. 2 is a block diagram of an example hardware system that may be used to implement an access point or mobile station.

FIG. 2 is a block diagram of an example hardware system 200 that may be used to implement the access point 102 or the mobile station 104. As FIG. 1 shows, the system 200 may include a network interface unit or radio frequency (RF) unit 202, a media access control (MAC) unit 204, a processor 206, a system memory 208, an operating system 210, input/output ports 212, and an estimation application 214. The estimation application 214 is stored on the system memory 208 or on any other suitable storage location or computer-readable medium. The estimation application 214 provides instructions that enable the processor 102 to perform the functions described herein.

Figure 3:
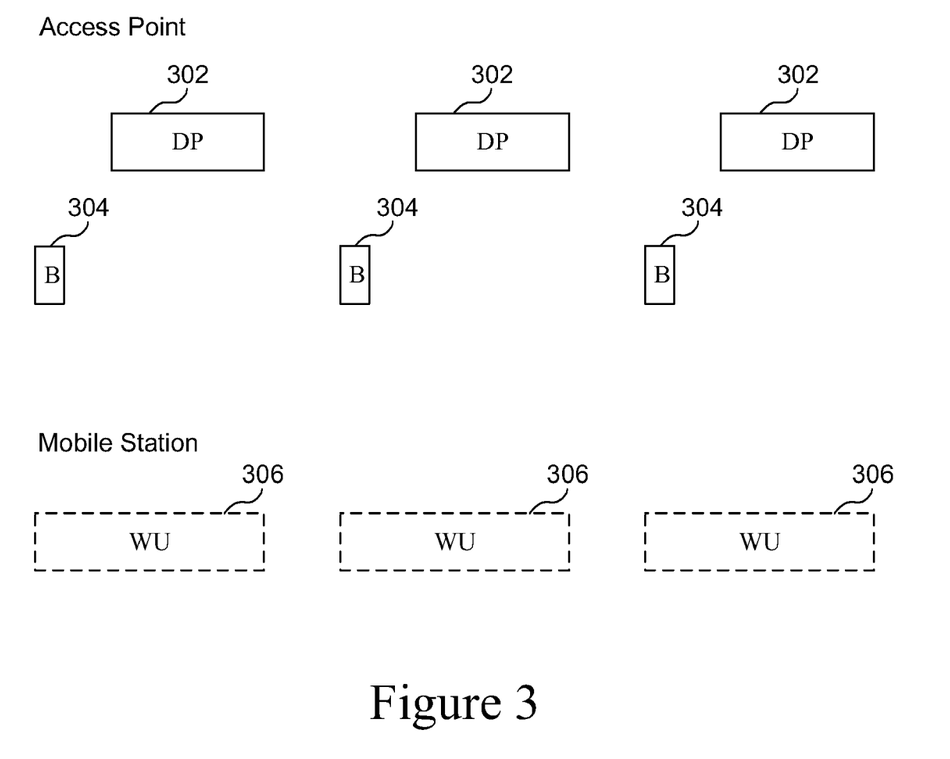
FIG. 3 is a timing diagram showing an example stream of data packets sent by the access point to the mobile station.

FIG. 3 is a timing diagram showing an example stream of data packets sent by the access point 102 to the mobile station 104 of FIG. 2. As FIG. 3 shows, the access point 102 sends a stream of packets, which may include data packets 302, beacon frames 304, as well as other management packets, to one or more mobile stations. Data packets 302 may include various types of data includes voice, video, etc. In one embodiment, the access point 102 broadcasts a beacon frame 304 before each data packet 302 to notify to the recipient mobile station to wake up in order to receive a data packet 302. As FIG. 3 shows, the mobile station 104 wakes up during wakeup zones 306 in order to receive data packets 302. In one embodiment, a given wakeup zone begins when the mobile station 104 receives a beacon frame 304, and the wakeup zone ends at the end of the data packet 302. Between wakeup zones, the mobile station 104 enters a power saving or sleep mode. During sleep mode, the mobile station 104 shuts down its radio or receiver. In one embodiment, the times during which the access point 102 is transmitting a data stream are referred to as the busy zones or active zones, and the time during which the access point 102 is not transmitting a data stream are referred to as idle zones or inactive zones.

Figure 4:
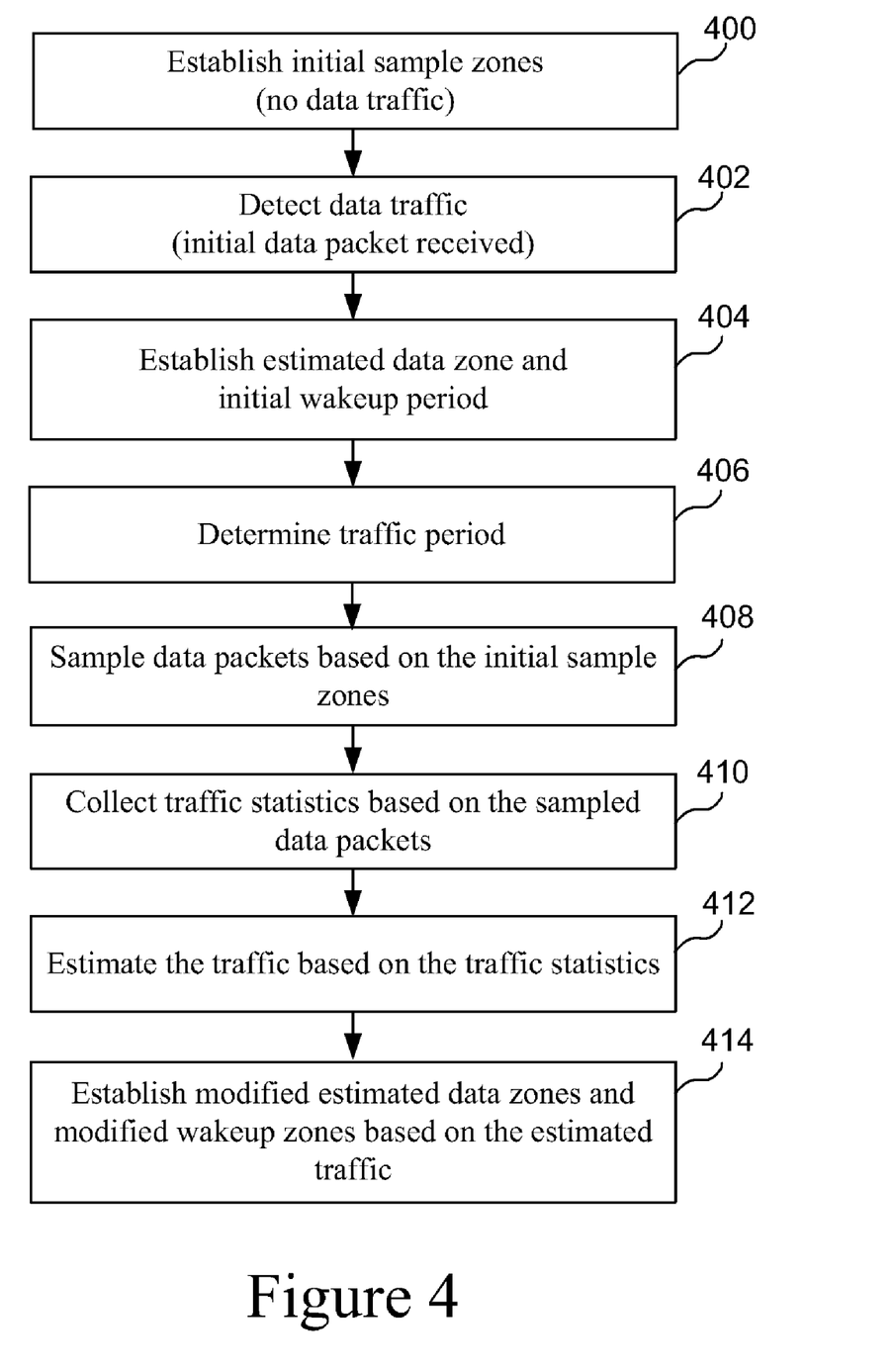
FIG. 4 is a flow chart showing a method for traffic estimating in accordance with one embodiment of the present invention.
Figure 5A:
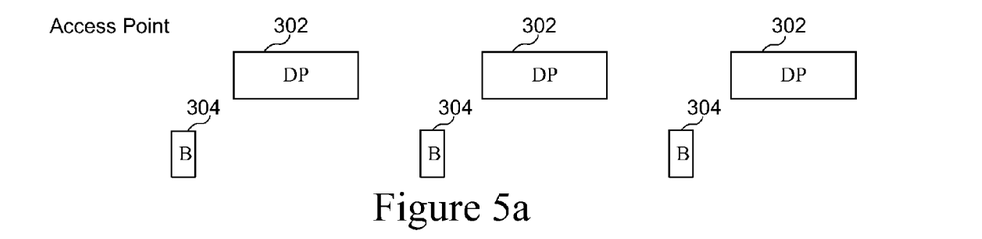
FIG. 5a is a timing diagram showing an example stream of data packets sent by the access point to the mobile station.
Figure 5B:
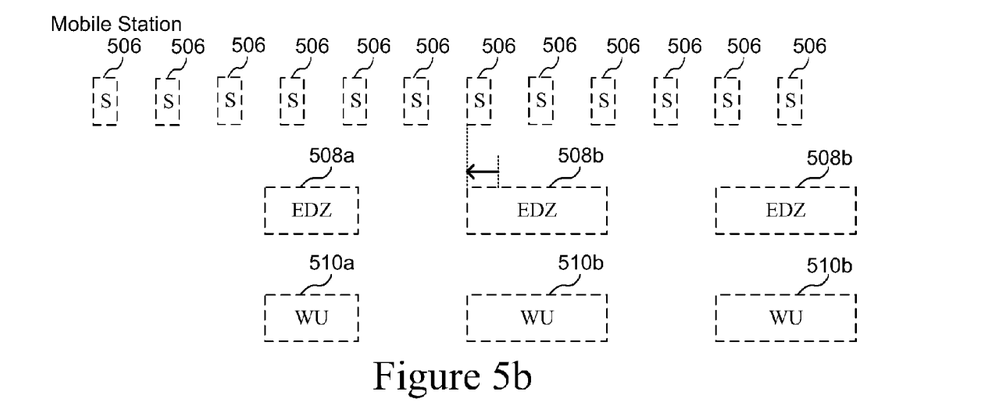
FIGS. 5b and 5c are timing diagrams showing sample zones, estimated data zones, and wakeup zones according to some embodiments of the present invention.
Figure 5C:
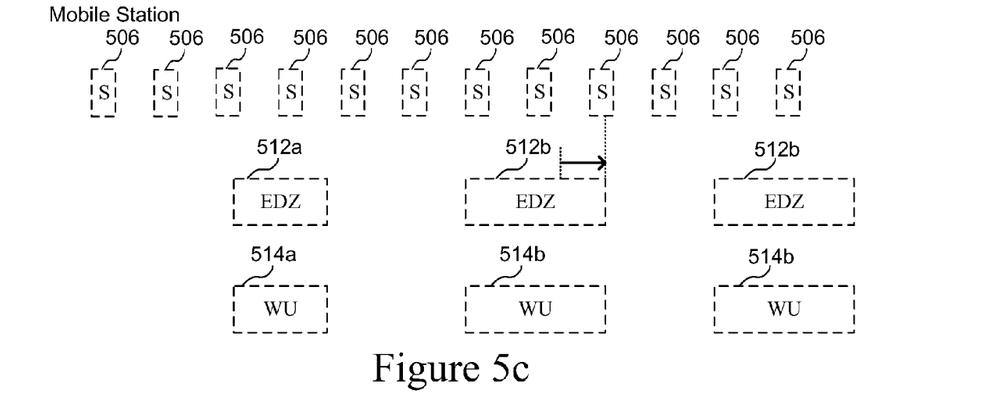
Figure 6:
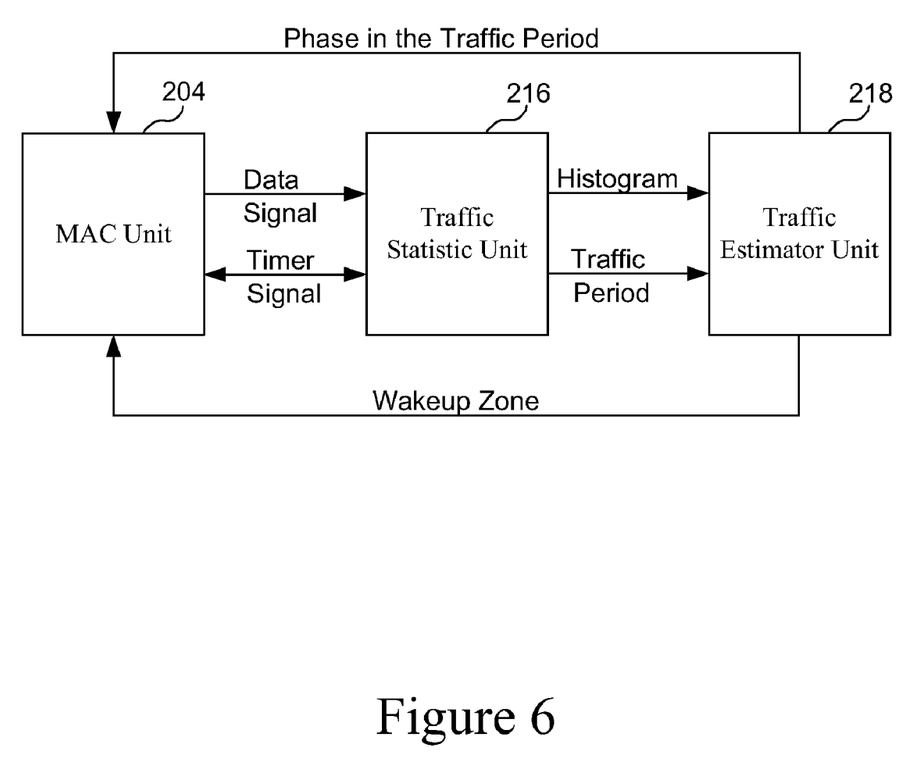
FIG. 6 is a diagram showing information flow among the MAC unit, traffic statistic unit, and a traffic estimator unit.

FIG. 4 is a flow chart showing a method for traffic estimating in accordance with one embodiment of the present invention. FIG. 5a is a timing diagram showing an example stream of data packets sent by the access point 102 to the mobile station 104. For ease of illustration, the stream of data packets including data packets 202 and beacons 204 of FIG. 2 is reproduced in FIG. 5a for comparison to the elements of FIGS. 3b and 3c. FIGS. 5b and 5c are timing diagrams showing sample zones, estimated data zones, and wakeup zones according to some embodiments of the present invention. FIG. 6 is a diagram showing information flow among the MAC unit 204, traffic statistic unit 216, and a traffic estimator unit 218. In one embodiment, the traffic statistic unit 216 and the traffic estimator unit 218 are a part of the estimation application 214.

Referring to FIGS. 4, 5a, 5b, and 6 together, the process begins in step 400 where the estimation application 214 establishes initial sample zones 506a during which the processor 206 samples the data packets 302. Initially, there is no data traffic. In one embodiment, the series of sample zones 506 have a predefined phase and period, and each sample zone has a predefined size or width. Next, in step 402, the estimation application 214 detects data traffic beginning with an initial data packet 302 (FIG. 5a).

Next, in step 404, the estimation application 214 establishes an estimated data zone 508a (also referred to as an estimated busy zone) and a wakeup zone 510a (also referred to as a wakeup duration, which is based on the estimated data zone 508a (FIG. 5b). In step 406, the estimation application 214 also determines the traffic period. As illustrated in FIG. 6, in one embodiment, when the MAC unit 204 receives data packets, the MAC unit 204 transmits a data signal containing the data packets to the traffic statistic unit 216. The traffic statistic unit 216 then determines the traffic period of the data packets. As described in more detail below, the traffic statistic unit 216 also generates a histogram of the data packets. The traffic statistic unit 216 then transmits the traffic period and the histogram to the traffic estimation unit 218. In one embodiment, the traffic estimation unit 218 establishes the estimation data zone and wakeup zone, as well as a phase of the traffic period, and then transmits this information to the MAC unit 204. Note that steps 404 and 406 may occur in any order and also simultaneously.

Referring again to FIG. 4, in step 408, the estimation application 214 samples data packets 302 based on the initial sample zones 506a, where the processor 206 generates or establishes a series of sample zones to collect data samples. The mobile station 104 wakes up during each sample zone to attempt to collect sample data packets 202. During a given sample zone, the mobile station 104 may capture some portion of a given data packet 302, or may not capture any portion of a data packet 302, depending on the placement of the sample zone relative to the data packets 302. In other words, sample zones may overlap busy zones and idle zones. In one embodiment, the frequency of the sample zones may be high enough and the width of the sample zones may be narrow enough such that multiple sample zones capture some portion of a given data packet 302.

Next, in step 410, estimation application 214 collects traffic statistics based on the sampled data packets 302. In one embodiment, the traffic statistic unit 216 of the estimation application 214 performs the traffic statistics collection. In one embodiment, the samples that capture at least some portion of a given data packets 302 collect traffic information about the data packets 302. For example, such traffic information may include timing information (e.g., when data is sampled), the amount of data during a given time period (20 MB/sec), the type of data (e.g., video, voice, etc.), etc. In one embodiment, the samples that do not capture any portion of data packets 302 also collect traffic information. For example, such traffic information may include timing information (e.g., idle zones where data is not being transmitted).

Next, in step 412, estimation application 214 estimates the traffic based on the sampling of the data packets 202 and more particularly based on the traffic statistics. For example, the estimation application 214 may estimate the period and duration of the data packets. In one embodiment, the estimation application 214 may utilize a frequency offset estimation process or other suitable estimation process in order to estimate the traffic based on the traffic statistics. When the estimation application 214 estimates the traffic, the estimation application 214 may determine, for example, the timing characteristics of the busy zones and the idle zones. As indicated above, in one embodiment, the estimation application 214 may generate a histogram of the traffic in order to facilitate estimation of the traffic. For example, the estimation application 214 may monitor a given number of data packets (e.g., 10 data packets) and record the start times and end times of the data packets, drift, etc.

Next, in step 414, the estimation application 214 establishes modified estimated data zones 508a based on the estimated traffic, modifies the wakeup zones 510a based on the estimated traffic and more particularly based on the modified estimated data zones 508b. Referring to FIG. 5b, in one embodiment, the estimation application 214 may modify the estimated data zones 508b and wakeup zones 510b by extending their start times to an earlier time in order to synchronize their start times with the start time of a most recent sample zone 506 that begins prior to the data packets 302. This ensures that the data zones 508b and wakeup zones 510b begin at or before the beginning of the data packet 302. In one embodiment, if the end of the estimated data zones 508b and wakeup zones 510b fall after the end of the data packets, the estimation application 214 detects the end of the data packets 302 in order to synchronize the end of the estimated data zones 508b and wakeup zones 510b with the end of the data packets 302.

Referring to FIG. 5c, in one embodiment, the estimation application 214 establishes modified estimated data zones 512a based on the estimated traffic, and modifies wakeup zones 514a based on the estimated traffic and more particularly based on the modified estimated data zones 512b by extending their end times to a later time in order to synchronize their end times to the end times of the data packets 302. As FIG. 5c shows, once the above-described synchronization is complete, the estimation application 214 modifies subsequent estimated data zones 508b and wakeup zones 510b while still achieving the above-described synchronization.

In one embodiment, the processor 206 continues to collect traffic statistics based on the sampled data packets 506 (step 410), estimate the traffic based on the traffic statistics (step 412), establish modified estimated data zones 508b and 512b and modified wakeup zones 510b and 514b (step 414).

Accordingly, the estimation application 214 knows when to go into a standby or sleep mode and when to wake up. As both FIGS. 5b and 5c show, the resulting wakeup zone 508b become synchronized with the incoming data packets 302. Also, the resulting wakeup zone 508b is significantly narrower than the initial wakeup zones 508a. This results in significant power savings, as the mobile station 104 can enter a power saving sleep mode for longer durations. In one embodiment, the estimation application 214 continually modifies the wakeup zones based on the estimated traffic in order to dynamically synchronize the wakeup zones to the data packets. While the wakeup zones are synchronized to the data packets, the estimation application 214 may lock the wakeup zone period until a modification is required to match a new period of the data packets. In one embodiment, the estimation application 214 may also eliminate sample zones during idle zones in order to provide further power conservation and then reintroduce sample zones when the wakeup zones need to be modified.

The mobile station 104 is operative to wake up as often as needed and with great accuracy due to estimation application 214 continually adjusting or calibrating the wakeup zones. As a result, the access point 102 can achieve greater throughput and would thus not require additional buffer sizes.

One of ordinary skill in the art will readily recognize that there could be variations to the embodiments, and that any variations would be within the spirit and scope of the present invention. For example, in the 802.11 standard, besides the beacon type of power saving mode described above, there is another power saving mode referred to as Unscheduled Automatic Power Saving Delivery (UAPSD) which is part of WiFi multimedia (WMM) power saving. WMM is a part of the 802.11e standard and is currently a part of standard WiFi certifications.

The basic different between UAPSD and the legacy beacon-type power saving mode is that in UAPSD mode, the access point (AP) stores the data until the station wakes up to request the stored data (which is usually shorter than beacon interval). As such, the UAPSD may be used to resolve the synchronization issue more elegantly. One reason is that, as described, the AP may store the data until station request for it. Another reason is that the station may wake up frequently enough that the AP need not have a large buffer.

When UAPSD/WMM is not supported, the embodiments describe above may apply. In alternative embodiments, where UAPSD/WMM is supported, the estimation application 214 may employ a reduced algorithm to simply provide a sample zone frequently enough such that the buffer of the AP does not fill up.

According to the system and method disclosed herein, the present invention provides numerous benefits. For example, embodiments enable flexible wakeup zones to provide significant power savings in diversified applications. Embodiments may be applied to any product and protocol standards such as IEEE 802.11 standards without having to add to or modify the protocol standards.

A method and system in accordance with the present invention for processing data streams has been disclosed. The method includes establishing a plurality of initial sample zones and sampling a plurality of data packets based on the plurality of initial sample zones. The method also includes establishing a plurality of wakeup zones. The method also includes collecting traffic statistics based on the sampled data packets, estimating the traffic based on the traffic statistics, and modifying the wakeup zones based on the estimated traffic. According to the method and system disclosed herein, the traffic estimation enables a mobile station to optimize wakeup periods.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Accordingly, many modifications may be made by one of ordinary skill in the art without departing from the spirit and scope of the appended claims.

What is claimed is:

1. A method for processing data streams, the method comprising:
    establishing a plurality of initial sample zones;
    establishing a plurality of wakeup zones;
    sampling a plurality of data packets by a processor based on the plurality of initial sample zones;
    estimating the traffic based on the sampling of the plurality of data packets;
    modifying the wakeup zones based on the estimated traffic;
    collecting traffic statistics based on the sampled data packets; and
    establishing modified estimated data zones based on the estimated traffic, wherein the wakeup zones are modified based on the modified estimated data zones, wherein the modifying wakeup zones comprises extending a start time of at least one wakeup zone to an earlier time in order to synchronize the start time of the at least one wakeup zone to the start time of a most recent sample zone that begins prior to a given data packet.

2. The method of claim 1 further comprising extending an end time of at least one wakeup zone to a later time in order to synchronizes the end time of the at least one wakeup zone to the end time of a given data packet.

3. The method of claim 1 wherein the traffic statistics comprise timing information.

4. A non-transitory computer-readable medium containing program instructions for processing data streams, the program instructions which when executed by a computer system cause the computer system to execute a method comprising:
    establishing a plurality of initial sample zones;
    establishing a plurality of wakeup zones;
    sampling a plurality of data packets based on the plurality of initial sample zones;
    estimating the traffic based on the sampling of the plurality of data packets;
    modifying the wakeup zones based on the estimated traffic;
    collecting traffic statistics based on the sampled data packets; and
    establishing modified estimated data zones based on the estimated traffic, wherein the wakeup zones are modified based on the modified estimated data zones, wherein the modifying wakeup zones comprises extending a start time of at least one wakeup zone to an earlier time in order to synchronize the start time of the at least one wakeup zone to the start time of a most recent sample zone that begins prior to a given data packet.

5. The non-transitory computer-readable medium of claim 4 further comprising extending an end of at least one wakeup zone to a later time in order to synchronizes the end time of the at least one wakeup zone to the end time of a given data packet.

6. The non-transitory computer-readable medium of claim 4 wherein the traffic statistics comprise timing information.

7. A system comprising:
a processor; and
a network interface unit coupled to the processor, wherein the process is operable to:
establish a plurality of initial sample zones;
establish a plurality of wakeup zones;
sample a plurality of data packets based on the plurality of initial sample zones;
estimate the traffic based on the sampling of the plurality of data packets;
collect traffic statistics based on the sampled data packets;
establish modified estimated data zones based on the estimated traffic, wherein the wakeup zones are modified based on the modified estimated data zones, wherein the start time of at least one modified wakeup zone is extended to an earlier time in order to synchronize the start time of at the least one modified wake up zone to the start time of a most recent sample zone that begins prior to a given data packet.

8. The system of claim 7 wherein the process is further operable to extend an end time of at least one wakeup zone to a later time in order to synchronizes the end time of the at least one wakeup zone to the end time of a given data packet.

* * * * *